United States Patent [19]

Watanabe

[11] Patent Number: 5,333,905
[45] Date of Patent: Aug. 2, 1994

[54] SHOULDER ANCHOR WEIGHT ADJUSTING APPARATUS

[75] Inventor: Yasutaka Watanabe, Aichi, Japan

[73] Assignee: Kabushiki Kaisha Tokai-Rika-Denki-Seisakusho, Aichi, Japan

[21] Appl. No.: 995,056

[22] Filed: Dec. 22, 1992

[30] Foreign Application Priority Data

Dec. 27, 1991 [JP] Japan ............................. 3-107975[U]
Nov. 26, 1992 [JP] Japan ............................. 4-081804[U]

[51] Int. Cl.⁵ ............................................. B60R 22/00
[52] U.S. Cl. ................................. 280/801.2; 74/89.15; 280/801.1; 280/808
[58] Field of Search ................... 280/801, 801 A, 808; 74/89.15

[56] References Cited

U.S. PATENT DOCUMENTS

5,074,591 12/1991 Yano et al. ..................... 280/801 A

FOREIGN PATENT DOCUMENTS

3715538 11/1987 Fed. Rep. of Germany .
3744577 7/1989 Fed. Rep. of Germany ... 280/801 A
2114559 2/1989 Japan .
3159840 11/1989 Japan .
399959 4/1991 Japan .
3159841 7/1991 Japan .

*Primary Examiner*—Eric Culbreth
*Attorney, Agent, or Firm*—Sixbey, Friedman, Leedom & Ferguson

[57] ABSTRACT

A shoulder anchor height adjusting apparatus is provided to adjust height of a shoulder anchor. A long bolt disposed at an upper portion of a side wall of a vehicle, has its axis in a vertical direction of the vehicle, and is provided so as to be rotatable about the axis. A nut is screwed to the long bolt, and moved in the vertical direction of the vehicle according to rotation of the long bolt. A slider fitted to the shoulder anchor, is supported by the nut, and moves in the same direction as moving direction of the nut as the nut moves in the vertical direction of the vehicle so as to move the shoulder anchor in the vertical direction. An engaging apparatus is provided between a slider and the long bolt. Normally, the engaging apparatus is in a disengaged from the slider. When the vehicle rapidly decelerates, load applied to the shoulder anchor causes the nut to displace the slider in the vertical direction of the vehicle resulting in the engaging apparatus being in an engaged with the slider so as to prevent the slider from moving in the vertical direction of the vehicle.

20 Claims, 9 Drawing Sheets

PRIOR ART

SHOULDER ANCHOR WEIGHT ADJUSTING APPARATUS

BACKGROUND OF THE INVENTION

1. Field of the Invention

The present invention relates to a shoulder anchor height adjusting apparatus for adjusting the height of a shoulder anchor by moving the shoulder anchor through which a longitudinal intermediate portion of a webbing is inserted, at an upper portion of a side wall of a vehicle in a vertical direction of the vehicle.

2. Description of the Related Art

In a three point seat belt for securing a passenger, one end of a webbing is wound up onto a webbing retractor which is mounted at a lower portion of a side wall of a vehicle. Further, the other end of the webbing is anchored by an anchor plate secured to the lower portion of the side wall of the vehicle through a shoulder anchor which is positioned at an upper portion of the side wall of the vehicle. A tongue plate is slidably fitted to the webbing between the shoulder anchor and the anchor plate. The tongue plate engages a buckle apparatus so that the webbing secures the passenger to the seat. The webbing between the shoulder anchor and the tongue plate forms a shoulder webbing, and the webbing between the tongue plate and the anchor plate forms a wrap webbing.

In order to adjust the shoulder webbing so as to conform to the body of the passenger, there is provided a shoulder anchor height adjusting apparatus for adjusting the height of the shoulder anchor.

Figure 9:
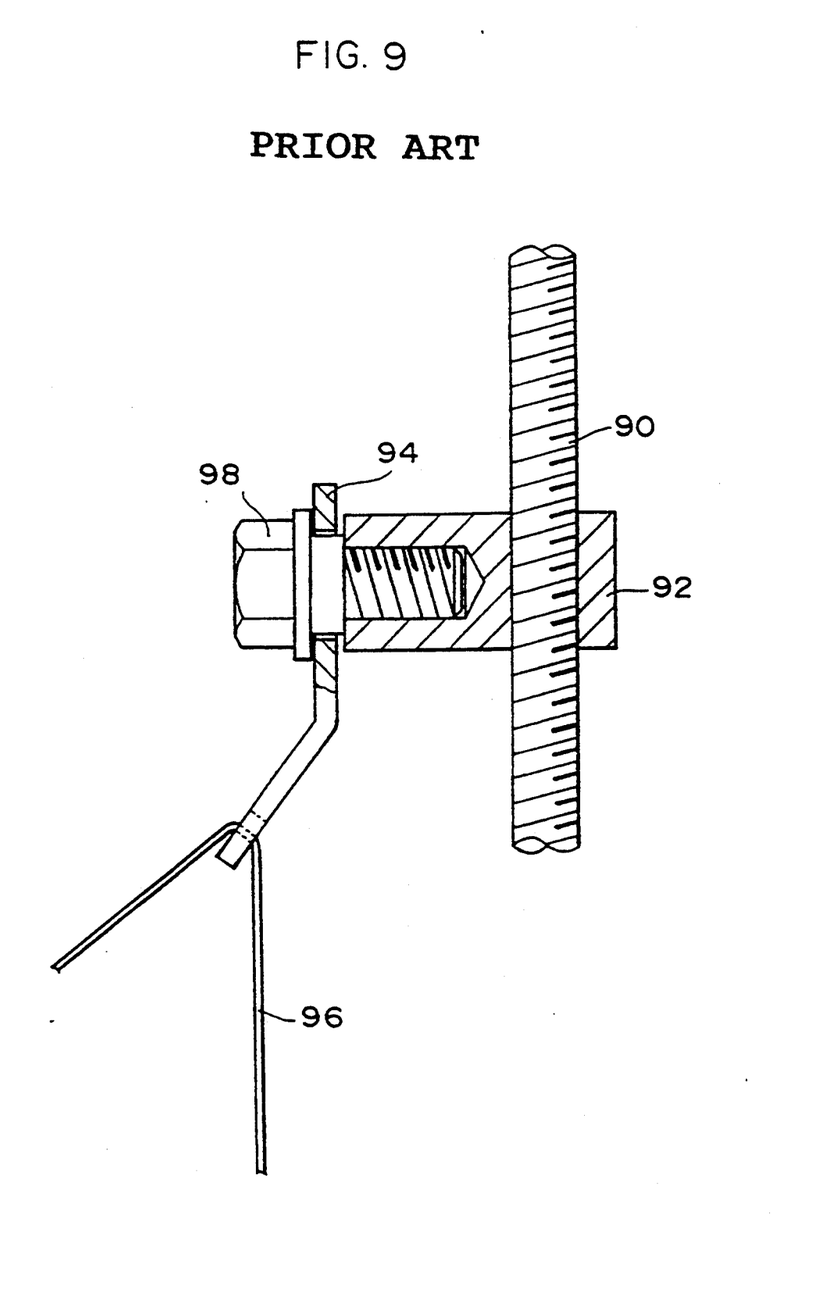
FIG. 9 is a vertical sectional view of a conventional shoulder anchor height adjusting apparatus as seen from the back of the vehicle.

In a conventional shoulder anchor height adjusting apparatus, as shown in FIG. 9, a long bolt 90 serving as a feed screw is disposed so as to have a vertical direction of the vehicle as its axial direction. Axial both ends of the long bolt 90 are rotatably supported at the upper portion of the side wall of the vehicle. A nut 92 serving as a screw member is screwed to the long bolt 90. A shoulder anchor 94 is mounted to the nut 92 by using an anchor bolt 98. The long bolt 90 is rotated by the driving force of a motor so that the nut 92 is moved with the shoulder anchor 94 in the vertical direction of the vehicle.

In the conventional shoulder anchor height adjusting apparatus, the inertia of the passenger causes forward movement when the vehicle rapidly decelerates. Accordingly, a fairly large load is exerted on the shoulder anchor 94 via the webbing 96. In this case, load in the vertical direction of the vehicle is absorbed by the feed screw. Consequently, the long bolt 90 and the nut 92 must be made of metal having high rigidity so as to ensure sufficient rigidity to resist the load in the vertical direction of the vehicle. However, if the long bolt 90 and the nut 92 are made of metal as described above, large frictional resistance is generated between the long bolt 90 and the nut 92 when adjusting the height of the shoulder anchor 94. Therefore, a large rotation torque is required for the long bolt 90. As a result, a large-sized motor becomes necessary, the weight of the shoulder anchor height adjusting apparatus increases, and production cost rises. In addition, operation noise becomes especially loud when a metal bolt 90 and metal nut 92 come in contact with each other.

SUMMARY OF THE INVENTION

In view of the facts as set forth hereinbefore, it is an object of the present invention to provide a shoulder anchor height adjusting apparatus which can resist a load generated in the apparatus when the vehicle rapidly decelerates. In the shoulder anchor height adjusting apparatus, it is possible in a normal condition to reduce friction when adjusting the height of the shoulder anchor, decrease rotation torque, reduce the weight of the apparatus as well as production cost. Lower operation noise can also be attained.

A shoulder anchor height adjusting apparatus of the present invention, for adjusting height of a shoulder anchor by moving the shoulder anchor through which a longitudinal intermediate portion of a webbing having one end wound up by a webbing retractor and the other end anchored by an anchor plate passes, at an upper portion of a side wall of a vehicle in a vertical direction of the vehicle. The apparatus comprises a feed screw disposed at the upper portion of the side wall of the vehicle, having an axis in the vertical direction of the vehicle, and being provided so as to be rotatable about the axis, a screw member screwed into the feed screw, and moving in the vertical direction of the vehicle by rotation of the feed screw, a shoulder anchor fitting member to which the shoulder anchor is fitted, supported by the screw member, the shoulder anchor fitting member moving in the same direction as the screw member as the screw member moves in the vertical direction of the vehicle so as to move the shoulder anchor in the vertical direction of the vehicle, and an engaging means provided between the shoulder anchor fitting member and the feed screw, the engaging means being in a disengaged from the shoulder anchor fitting member in a normal condition, being in an engaged with the shoulder anchor fitting member so as to prevent the shoulder anchor fitting member from moving in the vertical direction of the vehicle since a load applied to the shoulder anchor causes the screw member to displace the shoulder anchor fitting member in the vertical direction of the vehicle when the vehicle rapidly decelerates.

According to the present invention constructed as set forth above, the load applied to the shoulder anchor is small in the normal state so that the engaging means is in the disengaged from the shoulder anchor fitting member. The screw member moves in the vertical direction of the vehicle as the feed screw is rotated. The movement of the screw member causes the shoulder anchor fitting member to move in the vertical direction of the vehicle. Thus, it is possible to adjust the height of the shoulder anchor depending upon the movement of the screw member and the shoulder anchor fitting member. On the other hand, when the vehicle rapidly decelerates, inertia tends to move a passenger even though the passenger is secured by the webbing. Hence, the inertial motion exerts a fairly large load on the webbing. The load is exerted on the shoulder anchor fitting member through the shoulder anchor, and is further transmitted to the screw member. Due to the load, the screw member displaces the shoulder anchor in the vertical direction of the vehicle so that the engaging means is in the engaged with the shoulder anchor fitting member. In the engaged state, the displacement of the shoulder anchor in the vertical direction of the vehicle is blocked, and the load applied to the shoulder anchor fitting member is transmitted to the feed screw through the engaging means. As described above, the engaging means can resist the fairly large load generated due to the rapid deceleration of the vehicle. Therefore, the screw member may be made of a material having a small rigidity such as synthetic resin. As a result, in the normal state, it is possible to reduce friction when adjusting the height of the shoulder anchor, decrease the rotating torque, reduce the weight of the apparatus and the production cost thereof. In addition, the operation noise is lower.

According to another embodiment of the shoulder anchor height adjusting apparatus, the engaging means is provided with a lock member provided for the shoulder anchor fitting member to move with the shoulder anchor fitting member in the vertical direction of the vehicle, and an opposing lock member screwed to the feed screw to move in the vertical direction of the vehicle by the rotation of the feed screw. The lock member and the opposing lock member are in the disengaged state in the normal state, and the lock member is displaced with the shoulder anchor fitting member in the vertical direction of the vehicle so as to engage the opposing lock member when the vehicle rapidly decelerates.

In the shoulder anchor height adjusting apparatus constructed as set forth above, the engaging means is provided with a lock member provided for the shoulder anchor fitting member to move with the shoulder anchor fitting member in the vertical direction of the vehicle, and an opposing lock member screwed to the feed screw to move in the vertical direction of the vehicle by the rotation of the feed screw so as to be opposed to the lock member. In this construction, when the vehicle rapidly decelerates, the lock member engages the opposing lock member so that the load applied to the shoulder anchor fitting member is transmitted to the feed screw through the lock member and the opposing lock member.

According to still another embodiment of the shoulder anchor height adjusting apparatus, the engaging means is provided with a screw opposing portion opposed to a screw portion of the feed screw, and provided for the shoulder anchor fitting member to move with the shoulder anchor fitting member in the vertical direction of the vehicle. The screw opposing portion and the screw portion of the feed screw are in the disengaged state in the normal condition. The screw opposing portion is displaced with the shoulder anchor fitting member in the vertical direction of the vehicle to engage the screw portion of the feed screw when the vehicle rapidly decelerates.

In the shoulder anchor height adjusting apparatus constructed as set forth above, the engaging means is provided with a screw opposing portion opposed to a screw portion of the feed screw, and provided for the shoulder anchor fitting member to move with the shoulder anchor fitting member in the vertical direction of the vehicle. In the construction, when the vehicle rapidly decelerates, the screw opposing portion engages the screw portion of the feed screw so that the load applied to the shoulder anchor fitting member is transmitted to the feed screw through the screw opposing portion and the screw portion of the feed screw.

According to a still further embodiment of the shoulder anchor height adjusting apparatus, the shoulder anchor fitting member is provided with a supporting member, and the supporting member contacts a screw member so as to support the shoulder anchor fitting member by the screw member. Further, the engaging means is provided with a lock member provided for the shoulder anchor fitting member to move with the shoulder anchor fitting member in the vertical direction of the vehicle, and an opposing lock member screwed to the feed screw to move in the vertical direction of the vehicle by the rotation of the feed screw. In the normal state, the lock member and the opposing lock member are in the disengaging condition. When the vehicle rapidly decelerates, the lock member is displaced with the shoulder anchor fitting member in the vertical direction of the vehicle so as to engage the opposing lock member.

In the shoulder anchor height adjusting apparatus constructed as set forth above, the shoulder anchor fitting member is provided with the supporting member contacting the screw member so as to support the shoulder anchor fitting member by the screw member. Further, the engaging means is provided with a lock member provided for the shoulder anchor fitting member to move with the shoulder anchor fitting member in the vertical direction of the vehicle, and an opposing lock member screwed to the feed screw to move in the vertical direction of the vehicle by the rotation of the feed screw so as to enable contact with the lock member. In the construction, when the vehicle rapidly decelerates, the lock member contacts and engages the opposing lock member so that the load applied to the shoulder anchor fitting member is transmitted to the feed screw through the lock member and the opposing lock member.

DESCRIPTION OF THE PREFERRED EMBODIMENTS

A shoulder anchor height adjusting apparatus according to a first embodiment of the present invention will be described hereinafter with reference to FIGS. 1 to 4. In the drawings, the arrow marked FR denotes a forward direction of a vehicle, the arrow marked UP denotes an upward direction of the vehicle, and the arrow marked IN denotes an inward direction in a transverse direction of the vehicle or a cabin side, respectively.

Figure 4:
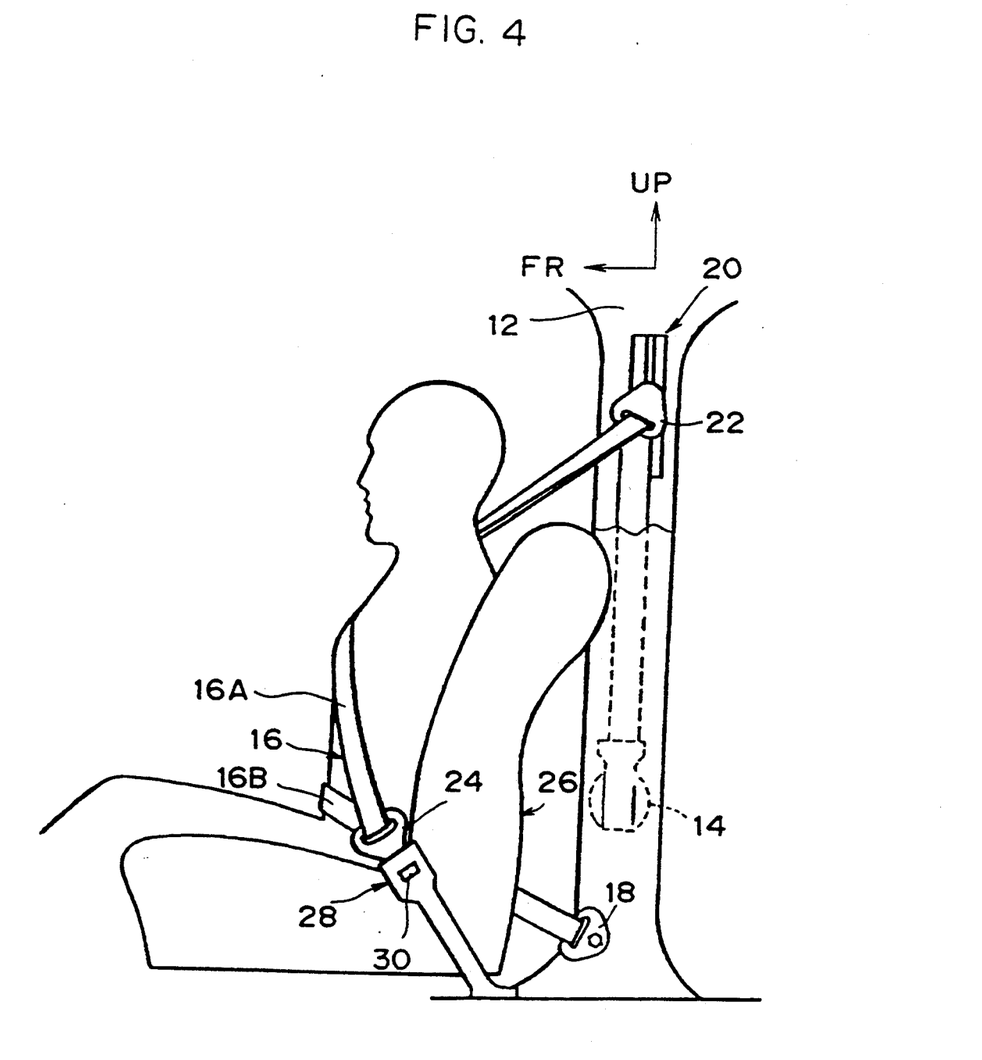
FIG. 4 is a schematic view of a three point seat belt apparatus as seen from an inward direction in the transverse direction of the vehicle.

FIG. 4 illustrates a three point seat belt apparatus. In the seat belt apparatus, a webbing retractor 14 is disposed in a lower portion of a side wall 12 of the vehicle. One end of a webbing 16 is wound up in layered fashion by the webbing retractor 14. An anchor plate 18 is secured to the lower portion of the side wall 12 of the vehicle at a position, which is below the webbing retractor 14. The other end of the webbing 16 is secured to the anchor plate 18. Further, an intermediate portion of the webbing 16 passes through the shoulder anchor 22 of the shoulder anchor height adjusting apparatus 20 and is folded. The shoulder anchor height adjusting apparatus 20 is provided at an upper portion of the side wall 12 of the vehicle. A tongue plate 24 is slidably fitted to the webbing 16 between the shoulder anchor 22 and the anchor plate 18. The tongue plate 24 removably engages a buckle apparatus 28 which is upwardly provided for a driver's seat 26 at an intermediate side inside a cabin.

When a passenger engages the tongue plate 24 with the buckle apparatus 28, the webbing 16 is secured to the passenger. At that time, the webbing 16 between the shoulder anchor 22 and the tongue plate 24 forms a shoulder webbing 16A, and the webbing 16 between the tongue plate 24 and the anchor plate 18 forms a wrap webbing 16B. The secured condition of the webbing 16 can be released by simply pushing a release button 30 of the buckle apparatus 28. The tongue plate 24 is thereby released from the buckle apparatus 28, and the webbing 16 is wound up by the webbing retractor 14.

Figure 2:
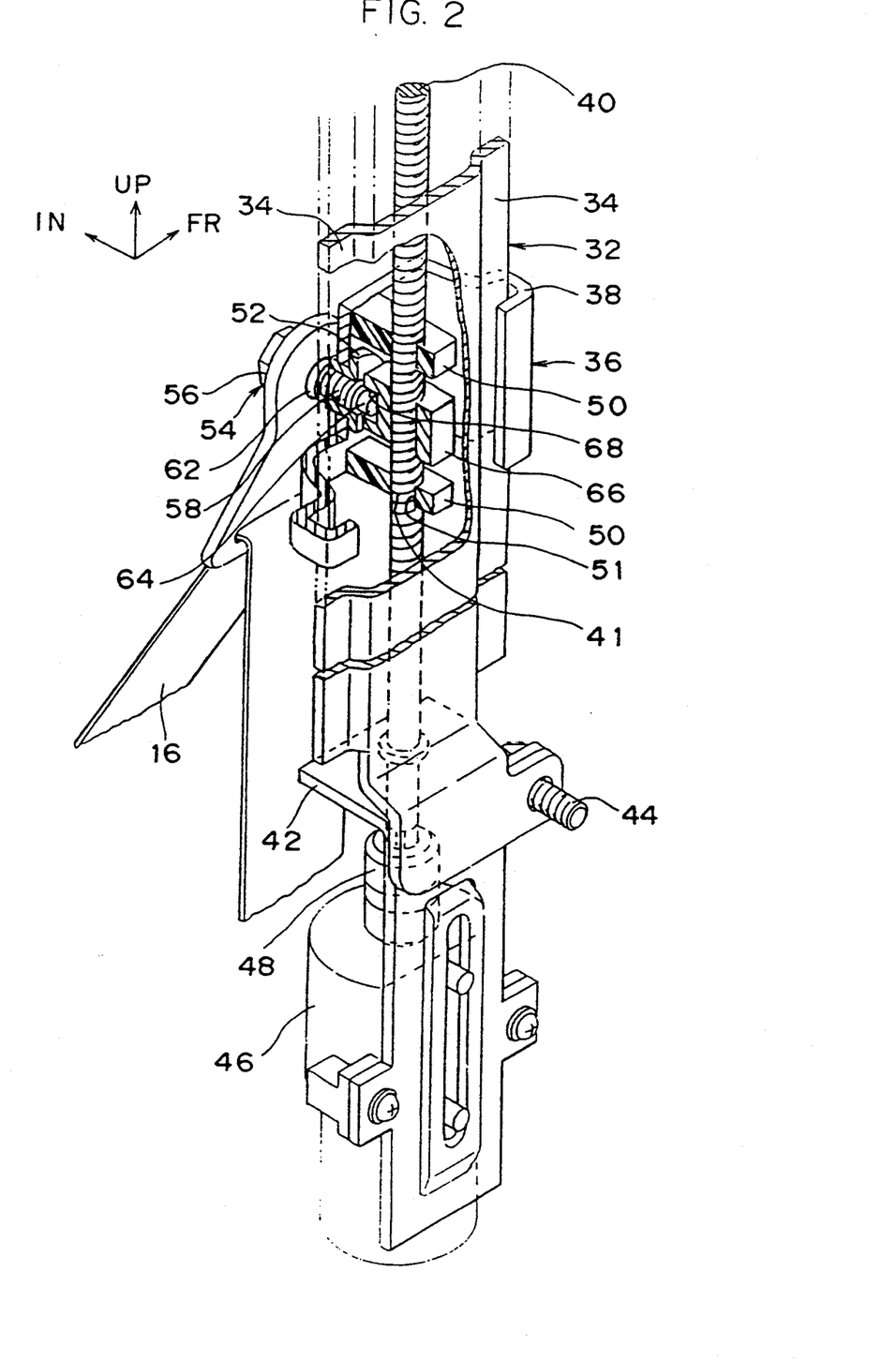
FIG. 2 is a perspective view of the first embodiment of the shoulder anchor height adjusting apparatus as seen from an outward direction in a transverse direction of the vehicle.

In the shoulder anchor height adjusting apparatus 20, a rail 32 is provided at the upper portion of the side wall 12 (shown in FIG. 4) of the vehicle as shown in FIG. 2. The length of the long rail 32 is provided in a vertical direction of the vehicle. Further, the rail 32 is provided with an intermediate portion in a longitudinal direction of the vehicle. The substantially rectangular intermediate portion outwardly extends in the transverse direction of the vehicle as seen from the vertical direction of the vehicle. The rail 32 is also provided with both sides in the longitudinal direction of the vehicle. The both sides serve as a guide piece 34 extending in the longitudinal direction of the vehicle.

Figure 3:
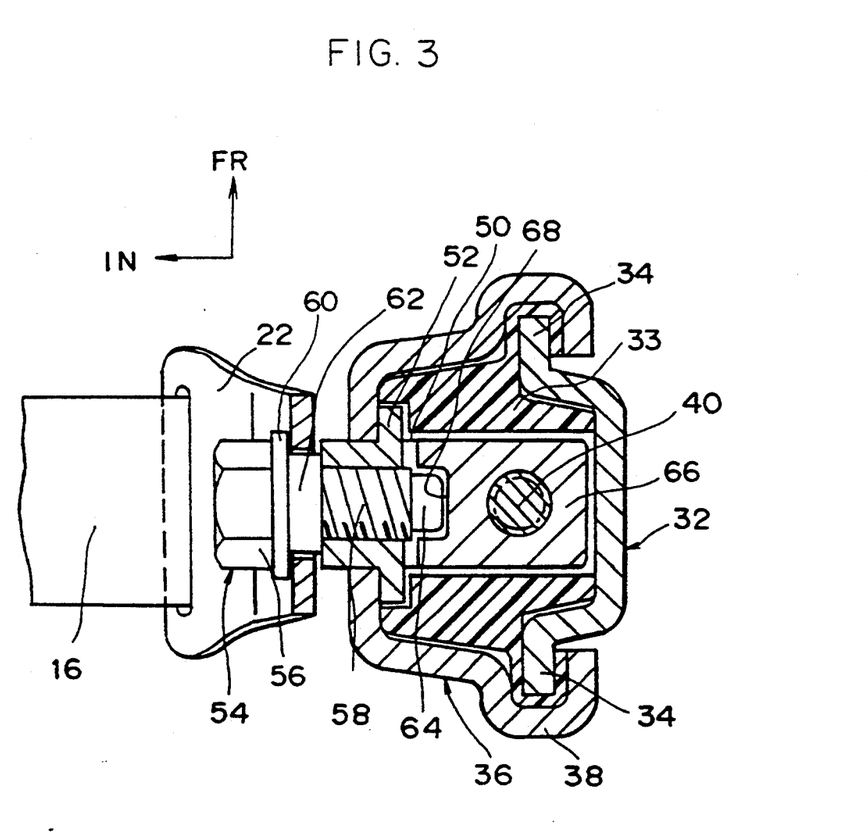
FIG. 3 is a sectional view taken along the line 3—3 of FIG. 1.

A slider 36 is provided on the inward side of the rail 32 in the transverse direction of the vehicle. The slider 36 and the rail 32 are made of metal. The slider 36 is provided with an intermediate portion in the longitudinal direction of the vehicle. The substantially rectangular intermediate portion extends inwardly in the transverse direction of the vehicle as seen from the vertical direction of the vehicle. Further, the slider 36 is provided with both sides in the longitudinal direction of the vehicle. The both sides serve as a substantially rectangular supporting piece 38 opposed to the guide piece 34 of the rail 32 as seen from the vertical direction of the vehicle. The supporting piece 38 engages the guide piece 34, and is guided by the guide piece 34. Hence, the slider 36 is slidable along the rail 32 in the vertical direction of the vehicle. In the slider 36, a shoe member 33 is interposed and fixed between the slider 36 and the rail 32 as shown in FIG. 3. The shoe member 33 can ensures a smooth sliding movement of the slider 36.

Figure 1:
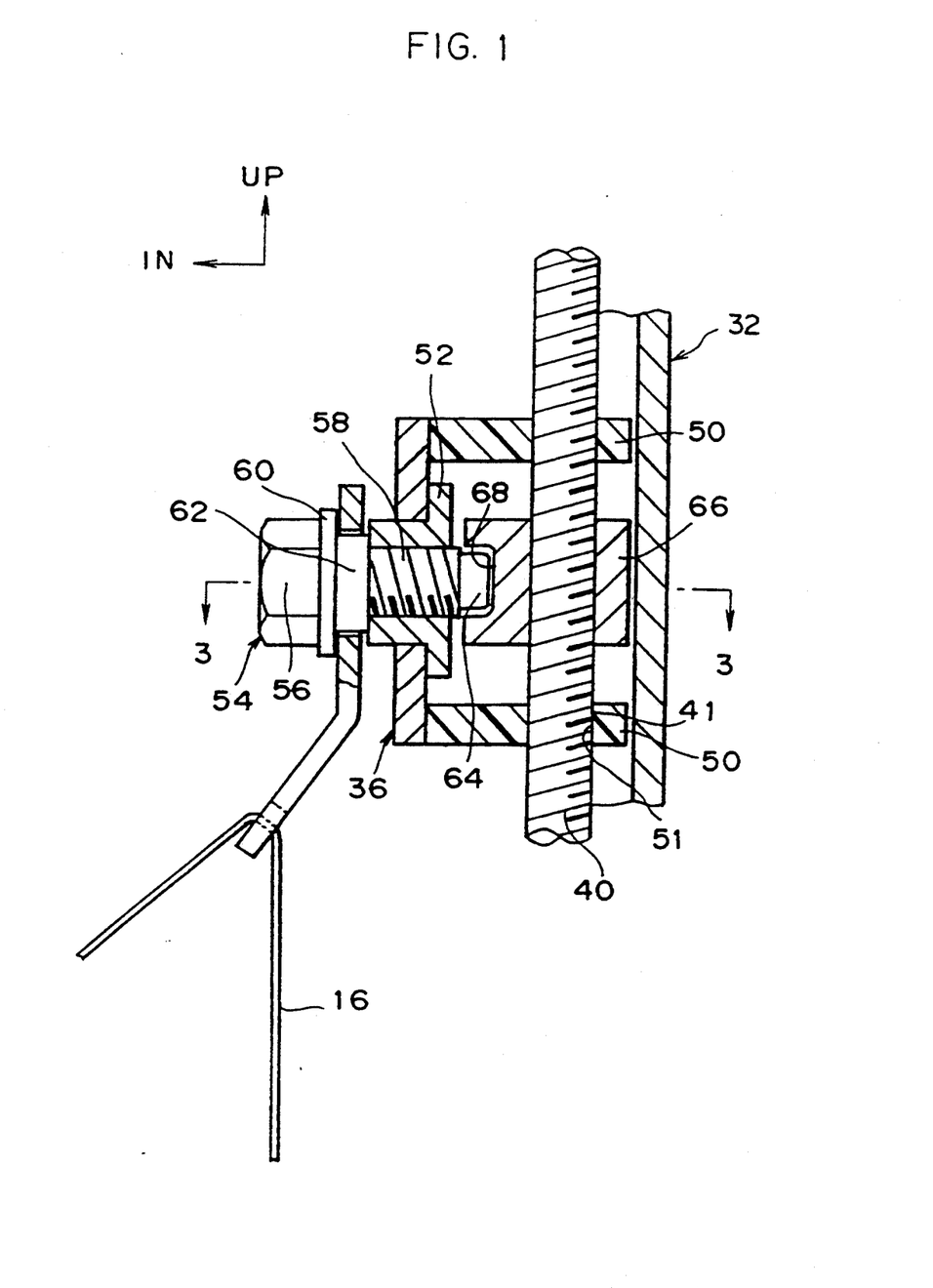
FIG. 1 is a vertical sectional view of a first embodiment of a shoulder anchor height adjusting apparatus of the present invention as seen from the back of a vehicle.

On the other hand, a long bolt 40 forming a feed screw is disposed between the slider 36 and the rail 32. The long bolt 40 is provided with the vertical direction of the vehicle as an axial direction of the long bolt 40.

The axial both ends of the long bolt 40 pass through and are supported by L-shaped supporting plates 42 (only one supporting plate 42 disposed at a lower end of the rail 32 is shown) extending outwardly in the transverse direction of the vehicle at the respective upper and lower ends of the rail 32. The axial both ends of the long bolt 40 are rotatable about an axis of the long bolt 40. The supporting plate 42 and the rail 32 are secured by an attaching bolt 44 to the side wall 12 of the vehicle.

A motor 46 is secured to the supporting plate 42 disposed at the lower end of the rail 32, and is coupled to the lower end of the long bolt 40 through a joint 48. The long bolt 40 is forwardly or reversely rotated by the driving motor 46. The motor 46 is operated by an operating switch provided for, for example, an unillustrated arm rest.

A pair of resin nuts 50, which are made of resin to form a screw member, are provided at an upper end and a lower end of the slider 36. The resin nuts 50 outwardly extend in the transverse direction of the vehicle, and are respectively screwed to the long bolt 40. Rotation of the resin nut 50 is restricted by the slider 36. The resin nut 50 is movable in the vertical direction of the vehicle as the long bolt 40 is rotated. Therefore, the slider 36 is also movable in the vertical direction of the vehicle.

An anchor nut 52 having a flange is provided for the slider 36 between the pair of resin nuts 50. The anchor nut 52 is provided with its axial direction as the transverse direction of the vehicle. A distal end of the anchor nut 52 passes through the slider 36, and extends toward the inward side of the vehicle.

An anchor bolt 54 is fixedly screwed into the anchor nut 52 outwardly in the transverse direction of the vehicle. The anchor bolt 54 is provided with a head portion 56 having a flange. Further, the anchor bolt 54 is provided with an intermediate stage portion 62 whose size is between a diameter of the flange 60 of the head portion 56 having the flange and a diameter of the male screw portion 58. The shoulder anchor 22 is fitted to an outer periphery of the intermediate stage portion 62. Thus, the shoulder anchor 22 is held between the head portion 56 having the flange and a distal end surface of the anchor nut 52. The anchor nut 52 and the anchor bolt 54 comprise a shoulder anchor fitting member.

A distal end of the anchor bolt 54 forms an engaging projection 64 passing through the anchor nut 52. The anchor bolt 54 is formed as a lock member.

On the other hand, a metal nut 66 is screwed to the long bolt 40 between the pair of resin nuts 50. The metal nut 66 is provided with an engaging concave portion 68 opposed to the engaging projection 64. The metal nut 66 is defined as an opposing lock member. Further, the metal nut 66 is movable in the vertical direction of the vehicle as the long bolt 40 is rotated in the same way as the resin nut 50. The engaging projection 64 is always arranged so as to correspond to the engaging concave portion 68.

The metal nut 66 is provided in a substantially rectangular form as seen from the vertical direction of the vehicle. The metal nut 66 is surrounded by the rail 32 and the shoe member 33 so that rotation of the metal nut 66 is blocked even if the long bolt 40 is rotated.

The engaging projection 64 is situation within the engaging concave portion 68. In a normal condition, the engaging concave portion 68 and the engaging projection 64 are not in contact with each other, i.e., are in a disengaged state. On the other hand, when the vehicle rapidly decelerates, the resin nut 50 is elastically or plastically deformed due to a load applied to the slider 36 via the shoulder anchor 22. It is assumed that if a screwed condition can not be maintained between a female screw portion 51 of the resin nut 50 and a male screw portion 41 forming a screw portion of the long bolt 40, or flexible deformation is generated in the resin nut 50, the resin nut 50 will operate so as to move the slider 36 in the vertical direction of the vehicle even if the long bolt 40 is not rotated. Hence, the engaging projection 64 contacts and engages the engaging concave portion 68 in the vertical direction of the vehicle. The load applied to the slider 36 is transmitted to the metal nut 66 through the engaging projection 64 and the engaging concave portion 68. Further, the load transmitted to the metal nut 66 is in turn transmitted to the long bolt 40. The movement of the slider 36 in the vertical direction of the vehicle is restricted by engagement of the engaging projection 64 and the engaging concave portion 68. As described hereinbefore, the lock member and the opposing lock member form an engaging means.

The operation of the embodiment will be described in the following.

The webbing 16 can be secured to the passenger after the passenger has sat in the seat 26 by simply engaging the tongue plate 24 with buckle apparatus 28. Thus, the webbing of the three point seat belt apparatus can be secured.

The height of the shoulder anchor 22 can be adjusted to conform to the body of a passenger after securing the webbing by simply operating an unillustrated operating switch to move the resin nut 50 in the vertical direction of the vehicle. As the resin nut 50 is moved, the slider 36 is moved in the vertical direction of the vehicle so as to adjust the height of the shoulder anchor 22 appropriately.

In the normal condition including a case where adjustment of the height is performed, a large load is not applied to the shoulder anchor 22 and only a small load is exerted on the slider 36. Further, the resin nut 50 is not plastically or elastically deformed, and the engaging projection 64 does not engage the engaging concave portion 68. The metal nut 66 can be moved in the vertical direction of the vehicle as the long bolt 40 is rotated while a disengaged state is held between the engaging projection 64 and the engaging concave portion 68.

On the other hand, though the passenger is secured by the webbing 16, the passenger moves according to inertia when the vehicle rapidly decelerates. This inertial movement is accompanied by a fairly large load applied to the webbing 16. The load is exerted on the slider 36 via the anchor bolt 54 by pulling the shoulder anchor 22. Further, the load acts on the resin nut 50. Hence, the resin nut 50 can not maintain the screwed state between the resin nut 50 and the male screw portion 41 of the long bolt 40 since the female screw portion 51 of the resin nut 50 is, for example, deformed. Thereafter, the resin nut 50 is lowered with respect to the long bolt 40, and therefore, the slider 36 is moved in a downward direction of the vehicle. Accordingly, the engaging projection 64 and the engaging concave portion 68 contact and engage with each other in the vertical direction of the vehicle. In the engaged state, the load applied to the slider 36 is transmitted to the metal nut 66 via the engaging projection 67 and the engaging concave portion 68. Further, the load transmitted to the metal nut 66 is in turn transmitted to the long bolt 40. As a result, movement of the shoulder anchor 22 in the vertical direction of the vehicle is blocked by the engagement between the engaging projection 64 and the engaging concave portion 68.

As set forth above, the resin nut 50 having inferior strength may be employed as the screw member since the metal nut 66 having superior strength can resist the fairly large load applied to the slider 36 when the vehicle rapidly decelerates. That is, the resin nut 50 is used in the normal condition. Therefore, when adjusting the height of the shoulder anchor 22, it is possible to decrease friction, lower rotation torque, reduce the weight of the apparatus and lower production cost thereof. Lower operation noise generated due to the friction is also a result.

Though the screw member is plastically or elastically deformed as noted above, the screw member may be made of resin or any other material, and a spring member or the like may be provided between the screw member and the slider. When the vehicle rapidly decelerates, the screw member may for example, be inclined toward the slider 36 by the elastic deformation of the spring member so as to move the slider 36 in the vertical direction of the vehicle even if the long bolt 40 is not rotated. Further, the engaging projection 64 may engage the engaging concave portion 68 according to the movement of the slider 36 in the vertical direction of the vehicle.

Figure 5:
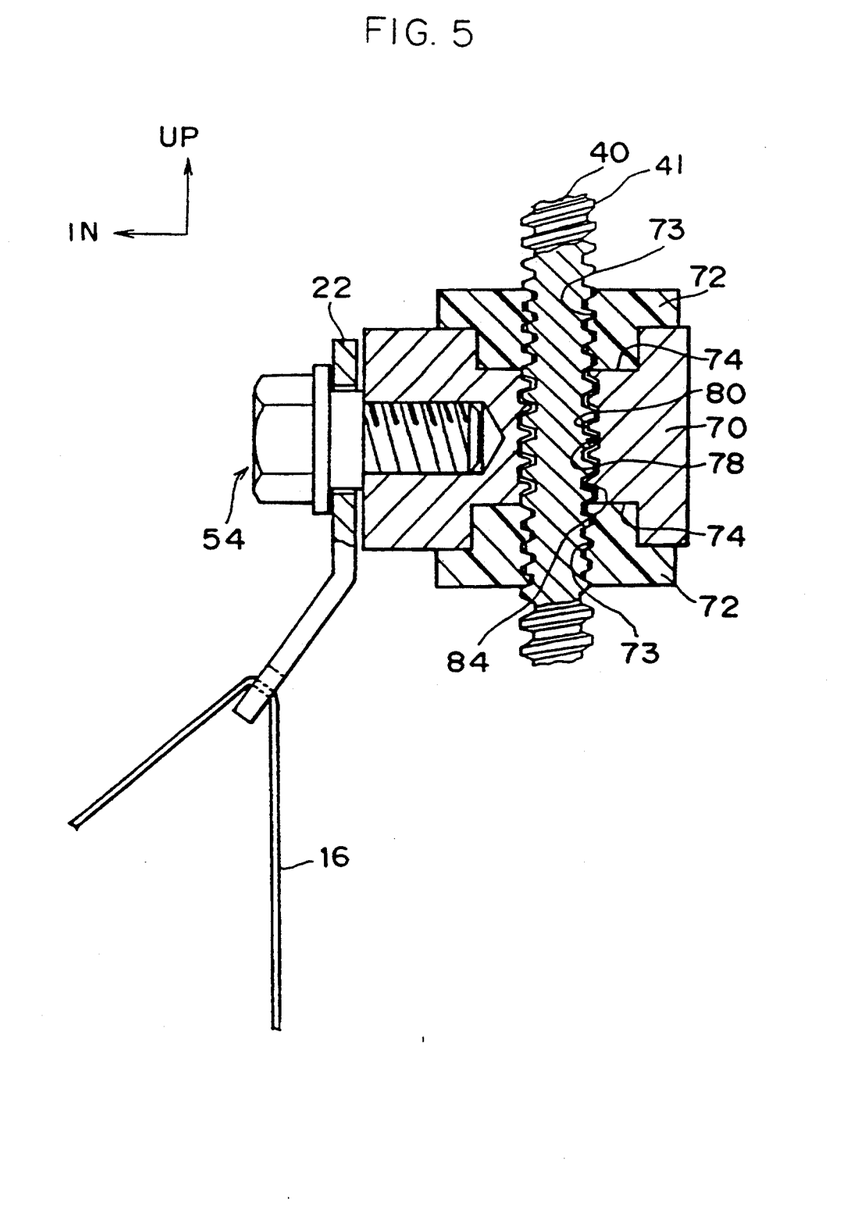
FIG. 5 is a vertical sectional view of a second embodiment of the shoulder anchor height adjusting apparatus of the present invention as seen from the back of the vehicle.

The operation of a second embodiment will be described hereinafter with reference to FIG. 5.

In the embodiment, a slider 70 is provided with a substantially H-shaped vertical section as seen from the longitudinal direction of the vehicle. The long bolt 40 passes through an intermediate portion of the slider 70. A resin nut 72 is provided in an upwardly convex form on a lower side of the slider 70 in the vertical direction of the vehicle. Another resin nut 72 is provided in a downwardly convex form on an upper side of the slider 70 in the vertical direction of the vehicle. These resin nuts 72 are respectively inserted for engagement into concave portions 74 which are provided in both ends of the slider 70 in the vertical direction of the vehicle. The slider 70 is provided with an opposing female screw portion 78 which is opposed to the male screw portion 41 of the long bolt 40 to form a screw opposing portion. The resin nut 72 is always screwed to the long bolt 40. However, though a top portion 80 of the opposing female screw portion 78 is inserted into a root portion 84 of the male screw portion 41 of the long bolt 40, the top portion 80 and the root portion 84 are not in contact with each other, and are in a disengaged state.

The upper and lower resin nuts 72 are concurrently moved in the vertical direction of the vehicle as the long bolt 40 is rotated. The movement of the resin nuts 72 causes the slider 70 to move in the vertical direction of the vehicle while the slider 70 is interposed between the respective resin nuts 72.

According to the second embodiment constructed as set forth above, the female screw portion 73 of the resin nut 72 is plastically or elastically deformed due to the load applied to the slider 70 when the vehicle rapidly decelerates. Consequently, it is impossible to maintain a screwed state between the female portion 73 and the male screw portion 41 of the long bolt 40. Hence, the slider 70 is moved to the lower side of the vehicle so that the top portion 80 of the opposing female screw portion 78 of the slider 70 contacts and engages the root portion 84 of the male screw portion 41 of the long bolt 40 in the vertical direction of the vehicle.

Thus, the load applied to the slider 70 is exerted between the top portion 80 of the opposing female screw portion 78 of the slider 70 and the root portion 84 of the male screw portion 41 of the long bolt 40.

Instead of using the opposing female screw portion 78 as the screw opposing portion, a convex piece may be employed for insertion into the root portion 84 of the male screw portion 41 of the long bolt 40 so as to form the screw opposing portion.

The anchor bolt 54 is directly fixed and clamped by screwing it to the slider 70. The second embodiment is different from the first embodiment in this respect. Except for this, other constructions and operational effects are the same as those in the first embodiment.

Figure 6:
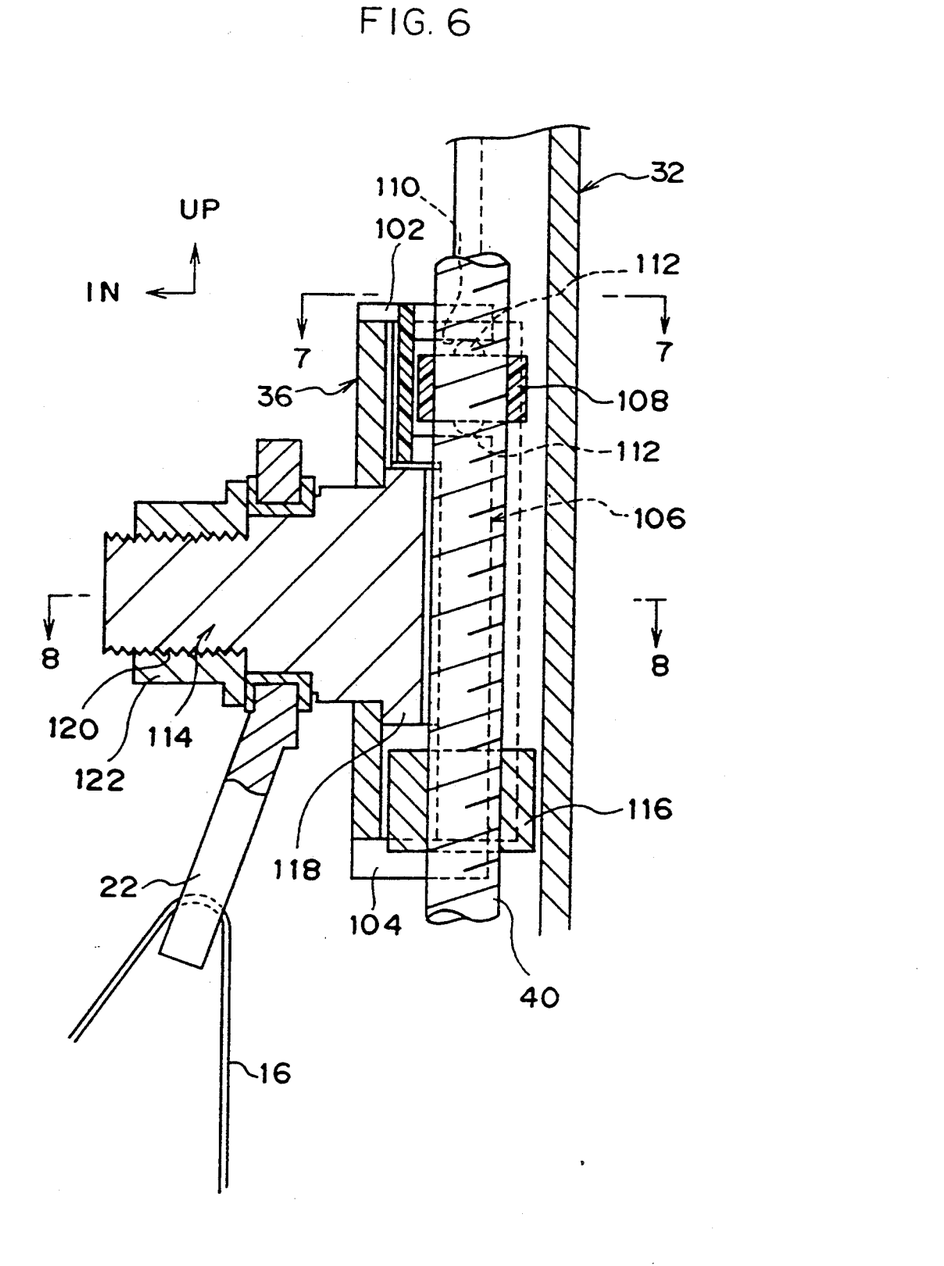
FIG. 6 is a vertical sectional view of a third embodiment of the shoulder anchor height adjusting apparatus of the present invention as seen from the back of the vehicle.

Subsequently, a third embodiment will be described hereinafter with reference to FIGS. 6 to 8.

In this embodiment, a shoe member 106 made of synthetic resin that forms a supporting member is interposed between the slider 36 and the rail 32. Clamping pieces 102, 104 are provided at upper and lower ends of the shoe member 106. The clamping pieces 102, 104 are provided over the upper and lower ends of the slider 36 so as to put the slider 36 between the clamping pieces 102 and 104. The clamping pieces 102, 104 can move with the slider 36 in the vertical direction of the vehicle. A supporting concave portion 110 forming a supporting portion is provided in the upper end of the shoe member 106 so that a resin nut 108 is screwed to the long bolt 40. On both sides of the long bolt 40, projections 112 are respectively and integrally provided (as shown in FIG. 7) with upper and lower surfaces of the resin nut 108 on a line. The line extends along the longitudinal direction of the vehicle and intersects the axis of the long bolt 40. The projections 112 respectively contact upper and lower inner surfaces of the supporting concave portion 110 of the shoe member 106, which are opposed to the projections 112.

Figure 7:
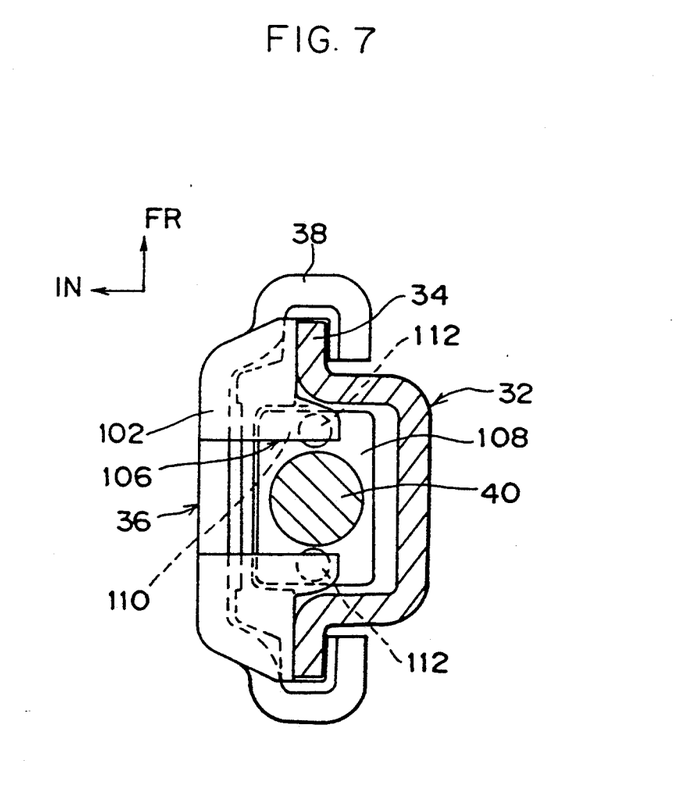
FIG. 7 is a sectional view taken along the line 7—7 of FIG. 6.
Figure 8:
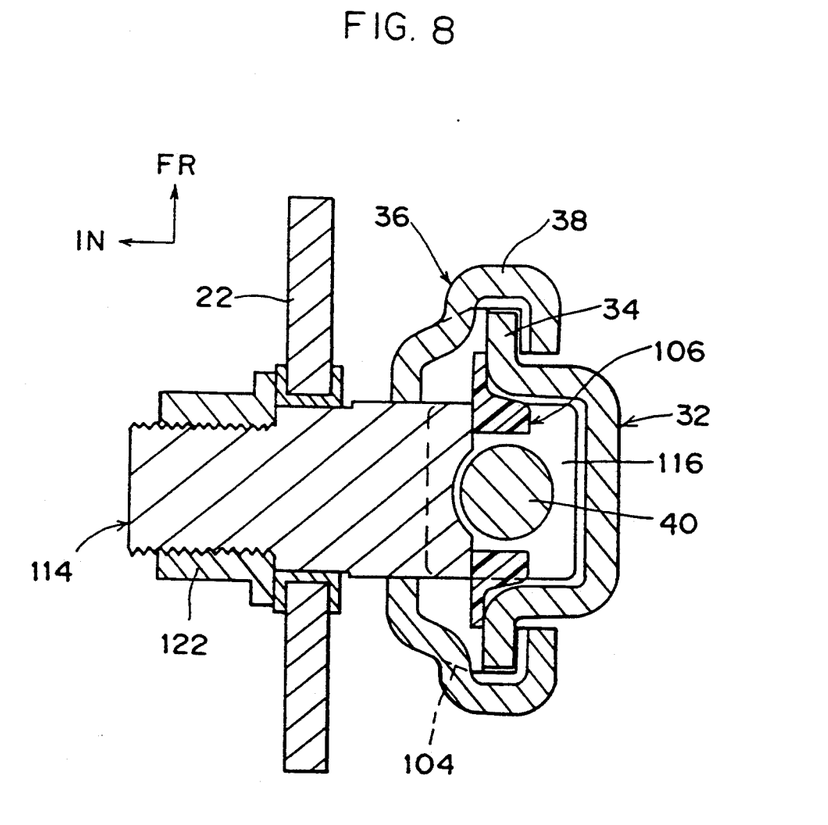
FIG. 8 is a sectional view taken along the line 8—8 of FIG. 6.

The resin nut 108 is of a substantially rectangular form as seen from the vertical direction of the vehicle, and is surrounded by the rail 32 and the shoe member 106 (as shown in FIG. 7). Irrespective of the rotation of the long bolt 40, rotation of the resin nut 108 is avoided. Since the rotation of the resin nut 108 is avoided, the resin nut 108 is movable in the vertical direction of the vehicle according to the rotation of the long bolt 40. When the resin nut 108 is moved in the vertical direction of the vehicle, the shoe member 106 moves with the slider 36 in the vertical direction of the vehicle through the projection 112 of the resin nut 108.

An anchor bolt 114 for attaching the shoulder anchor 22 is provided with a large diameter main end 118 which is positioned on a side of the long bolt 40 with respect to the slider 36. Further, the anchor bolt 114 is secured to the slider 36 such that a distal end of the anchor bolt 114 can pass through the slider 36 to extend inwardly in the transverse direction of the vehicle. The nut 122 is screwed onto a male screw portion 120 which is provided at the distal end of the anchor bolt 114. Thus, the shoulder anchor 22 can be held between the nut 122 and the slider 36.

A metal nut 116 screwed to the long bolt 40 is disposed at a lower side of the large diameter main end 118 of the anchor bolt 114 so as not to contact a lower surface of the large diameter main end 118. The metal nut 116 is provided in a rectangular form as seen from the vertical direction of the vehicle, and is surrounded by the rail 32 and shoe member 106 as with the resin nut 108 (as shown in FIG. 8). Irrespective of the rotation of the long bolt 40, rotation of the metal nut 116 is avoided. Since the rotation of the metal nut 116 is avoided, the metal nut 116 becomes movable in the vertical direction of the vehicle as the long bolt 40 is rotated.

According to the third embodiment constructed as set forth above, in the normal condition, the resin nut 108 is moved in the vertical direction of the vehicle by the rotation of the long bolt 40. When the resin nut 108 is moved, the shoe member 106 is pushed by the projection 112 of the resin nut 108. The slider 36 moves with the shoe member 106 in the vertical direction of the vehicle so as to adjust the height of the shoulder anchor 22 appropriately.

At this time, the metal nut 116 moves in the vertical direction of the vehicle like the resin nut 108, and does not contact the lower surface of the large diameter main end 118 of the anchor bolt 114.

When the vehicle rapidly decelerates, a load is applied to the slider 36 via the webbing 16. The resin nut 108 and the shoe member 106 can not resist the load in terms of strengths so that the screwed state of the resin nut 108 and the long bolt 40 can not be maintained. Or the shoe member 106 may, for example, deform. Accordingly, the slider 36 is lowered, and the lower surface of the large diameter main end 118 of the anchor bolt 114 contacts an upper surface of the metal nut 116 so as to engage the metal nut 116 with the anchor bolt 114. The engagement between the metal nut 116 and the anchor bolt 114 prevents the slider 36 from being lowered. The load is applied to the metal nut 116 and the load of the anchor bolt 114 is transmitted to the metal nut 116. That is, the anchor bolt 114 forms a lock member, and the metal nut 116 forms an opposing lock member.

The projections 112 of the resin nut 108 contact the respective upper and lower inner surfaces of the supporting concave portion 110 of the shoe member 106 on a line perpendicular to the axis of the long bolt 40. Consequently, when the slider 36 is vertically moved by the vertical movement of the resin nut 108 according to the rotation of the long bolt 40, that vertical motion can be very smoothly transmitted from the resin nut 108 to the slider 36.

It must be noted that the operational effects of the present invention should not be decreased depending upon the number or the position of the projections 112 of the resin nut 108, or presence or absence of the projections 112. In order to support the slider 36 by the resin nut 108, the supporting concave portion 110 of the shoe member 106 is provided as the supporting portion for supporting the slider 36. However, the supporting portion may be provided so as to directly contact the slider 36 with the resin nut 108 not through the shoe member 106.

Other constructions and operational effects are the same as those of the first embodiment.

It must be noted that the present invention should not be limited to the respective embodiments, and various modifications can be made. For example, the pair of resin nuts 50 and 72 are provided in the first and second embodiment. However, the resin nut may be one. The number of resin nuts should not be limited.

In the embodiments, though the long bolt 40 is rotated by a driving motor, the long bolt 40 may be manually rotated.

What is claimed is:

1. A shoulder anchor height adjusting apparatus having a slider for adjusting a height of a shoulder anchor by moving said shoulder anchor through which a longitudinal intermediate portion of a webbing having one end wound up by a webbing retractor and the other end anchored by an anchor plate passes, at an upper portion of a side wall of a vehicle in a vertical direction of said vehicle, said apparatus comprising:

a feed screw disposed at said upper portion of said side wall of said vehicle, having an axis in the vertical direction of said vehicle, and being provided so as to be rotatable about said axis;

a screw member disposed on said slider and screwed to said feed screw, and moving in the vertical direction of said vehicle by rotation of said feed screw;

a shoulder anchor fitting member for mounting said shoulder anchor on said slider, said shoulder anchor fitting member moving in the same direction of said screw member as said screw member moves in the vertical direction of said vehicle so as to move said shoulder anchor in the vertical direction of said vehicle; and an engaging means movably engaged with said feed screw and disposed so as to be contactable with said shoulder anchor fitting member, said engaging means being disengaged from said shoulder anchor fitting member in a normal condition, and being engaged with said shoulder anchor fitting member so as to prevent said shoulder anchor fitting member from moving in the vertical direction of said vehicle by a load applied to said shoulder anchor through said webbing, which causes said screw member to displace said shoulder anchor fitting member in the vertical direction of said vehicle when said vehicle rapidly decelerates.

2. A shoulder anchor height adjusting apparatus according to claim 1, wherein aid engaging means is provided with a lock recess, and said shoulder anchor fitting member is provided with a lock projection which is engagable with said lock recess of said engaging means to move with said shoulder anchor fitting member in the vertical direction of said vehicle when engaged therebetween when said vehicle rapidly decelerates, and said lock recess and said lock projection are to be apart from each other in the normal condition.

3. A shoulder anchor height adjusting apparatus according to claim 2, wherein said lock projection is provided at one end of said shoulder anchor fitting member in the transverse direction of said vehicle, said lock projection is provided so as to be engagable with said engaging means.

4. A shoulder anchor height adjusting apparatus according to claim 3, wherein said lock recess is provided at one end of said engaging means in the transverse direction of said vehicle, said lock recess provided so as to be separated from said lock projection at predetermined intervals in the normal condition.

5. A should anchor height adjusting apparatus according to claim 1, wherein said engaging means is provided with a space opposed to a screw portion of said shoulder anchor fitting member, said space of said engaging means and said screw portion of said shoulder anchor fitting member being spaced from each other in the normal condition, and contacting each other when said vehicle rapidly decelerates.

6. A shoulder anchor height adjusting apparatus according to claim 5, wherein said screw member includes a pair of nuts provided at both vertical ends in the vertical direction of said vehicle.

7. A shoulder anchor height adjusting apparatus according to claim 1, wherein said slider is provided with a supporting member, said supporting member contacts said screw member so as to hold said engaging means in a disengaged state part from said shoulder anchor fitting member in the normal condition.

8. A shoulder anchor height adjusting apparatus according to claim 7, wherein said shoulder anchor fitting member has a lock portion and said engaging means has an opposite lock portion to move with said shoulder anchor fitting member in the vertical direction of said vehicle and a screw portion screwed with a space to said feed screw to move in the vertical direction of said vehicle by rotation of said feed screw, said lock portion and said opposite lock portion are in the disengaged state in the normal condition, said lock portion is displaced with said shoulder anchor fitting member in the vertical direction of said vehicle so as to engage said opposite lock portion when said vehicle rapidly decelerates.

9. A shoulder anchor height adjusting apparatus according to claim 8, wherein said opposite lock portion is provided at an upper end portion of said engaging means so as to enable contact of a lower end portion of said lock portion in the vertical direction of said vehicle with said shoulder anchor fitting member.

10. A shoulder anchor height adjusting apparatus according to claim 7, wherein said shoulder anchor fitting member includes a nut provided in a vicinity of an upper end of said shoulder anchor fitting member.

11. A shoulder anchor height adjusting apparatus according to claim 1, wherein said shoulder anchor fitting member includes a pair of nuts provided on an upper side and a lower side of said engaging means in the vertical direction of said vehicle, and has one end base portion in a transverse direction of said vehicle secured to said shoulder anchor fitting member.

12. A shoulder anchor height adjusting apparatus having a slider for adjusting height of a shoulder anchor by moving said shoulder anchor through which a longitudinal intermediate portion of a webbing having one end wound up by a webbing retractor and the other end anchored by an anchor plate passes, at an upper portion of a side wall of a vehicle in a direction of said vehicle, said apparatus comprising:

a long bolt disposed at said upper portion of said side wall of said vehicle, having an axis in the vertical direction of said vehicle, and being provided so as to be rotatable about said axis;

a screw member screwed to said long bolt, and moving in the vertical direction of said vehicle by rotation of said long bolt;

a shoulder anchor fitting member to which said shoulder anchor is fitted, supported by said screw member, said shoulder anchor fitting member moving in the same direction of said screw member as said screw member moves in the vertical direction of said vehicle so as to move said shoulder anchor in the vertical direction of said vehicle; and a lock member movably engaged with said long bolt and disposed so as to be contactable with said shoulder anchor fitting member; wherein said shoulder anchor fitting member includes an opposite lock portion moving in the vertical direction of said vehicle by rotation of said long bolt so as to enable contact with said lock member, said lock member and said opposite lock member being disengaged in the normal condition, a load applied to said shoulder anchor causing said screw member to displace said shoulder anchor fitting member in the vertical direction of said vehicle so as to displace said lock member with said shoulder anchor fitting member in the vertical direction of said vehicle when said vehicle rapidly decelerates, and said lock member engages said opposite lock portion so as to avoid displacement of said shoulder anchor fitting member in the vertical direction of said vehicle.

13. A shoulder anchor height adjusting apparatus according to claim 12, wherein said screw member includes a pair of resin nuts respectively provided on an upper side and a lower side of said opposite lock member in the vertical direction of said vehicle, and respectively having inward ends in a transverse direction of said vehicle secured to said shoulder anchor fitting member.

14. A shoulder anchor height adjusting apparatus according to claim 12, wherein said opposite lock member is a bolt passing through said shoulder anchor and said shoulder anchor fitting member, said bolt has an engaging projection at an outward end of said bolt in the transverse direction of said vehicle, said engaging projection is provided so as to be engagable with said lock member.

15. A shoulder anchor height adjusting apparatus according to claim 14, wherein said lock member is made of material having a rigidity higher than a rigidity of said screw member, and is provided with an engaging concave portion at an inward end of said lock member in the transverse direction of said vehicle, said engaging concave portion being provided so as to be separated from said engaging projection at predetermined intervals.

16. A shoulder anchor height adjusting apparatus having a slider for adjusting height of a shoulder anchor by moving said shoulder anchor through which a longitudinal intermediate portion of a webbing having one end wound up by a webbing retractor and the other end anchored by an anchor plate passes, at an upper portion of a side wall of a vehicle in a vertical direction of said vehicle, said apparatus comprising:

a long bolt disposed at said upper portion of said side wall of said vehicle, having an axis in the vertical direction of said vehicle, and being provided so as to be rotatable about said axis;

a screw member screwed to said long bolt, and moving in the vertical direction of said vehicle by rotation of said long bolt;

a shoulder anchor fitting member to which said shoulder anchor is fitted, made of material having a rigidity higher than a rigidity of said screw member to be supported by said screw member, said shoulder anchor fitting member moving in the same direction of said screw member as said screw member moves in the vertical direction of said vehicle so as to move said shoulder anchor in the vertical direction of said vehicle;

a female screw portion provided for said shoulder anchor fitting member opposed to a screw portion of said long bolt, being displaced with said shoulder anchor fitting member in the vertical direction of said vehicle, said female screw portion and said screw portion of said long bolt being disengaged, a load applied to said shoulder anchor causing said screw member to displace said shoulder anchor fitting member in the vertical direction of said vehicle so as to displace said female screw portion with said shoulder anchor fitting member in the vertical direction of said vehicle when said vehicle rapidly decelerates, and said female screw portion engaging said screw portion of said long bolt so as to avoid displacement of said shoulder anchor fitting member in the vertical direction of said vehicle.

17. A shoulder anchor height adjusting apparatus according to claim 16, wherein said screw member includes a pair of resin nuts respectively secured to both end surfaces of said shoulder anchor fitting member in the vertical direction of said vehicle.

18. A shoulder anchor height adjusting apparatus having a slider for adjusting height of a shoulder anchor by moving said shoulder anchor through which a longitudinal intermediate portion of a webbing having one end wound up by a webbing retractor and the other end anchored by an anchor plate passes, at an upper portion of a side wall of a vehicle in a vertical direction of said vehicle, said apparatus comprising:

a long bolt disposed at said upper portion of said side wall of said vehicle, having an axis in the vertical direction of said vehicle, and being provided so as to be rotatable about said axis;

a screw member screwed to said long bolt, and moving in the vertical direction of said vehicle by rotation of said long bolt;

a shoulder anchor fitting member to which said shoulder anchor is fitted, supported by said screw member, said shoulder anchor fitting member moving in the same direction of said screw member as said screw member moves in the vertical direction of said vehicle so as to move said shoulder anchor in the vertical direction of said vehicle;

a supporting member securing said shoulder anchor fitting member by holding both ends of said shoulder anchor fitting member in the vertical direction of said vehicle between said supporting member, and holding said screw member between said supporting member so as to support said shoulder anchor fitting member by said screw member;

an anchor bolt provided for said shoulder anchor fitting member to pass through said shoulder anchor and said shoulder anchor fitting member, said anchor bolt moving with said shoulder anchor fitting member in the vertical direction of said vehicle; and a lock member made of material having a rigidity higher than a rigidity of said screw member, screwed to said long bolt, and being provided to move in the vertical direction of said vehicle by said rotation of said long bolt so as to be able to contact said anchor bolt, said anchor bolt and said lock member being disengaged in a normal condition, load applied to said shoulder anchor causing said screw member to displace said shoulder anchor fitting member in the vertical direction of said vehicle so as to displace said bolt with said shoulder anchor fitting member in the vertical direction of said vehicle when said vehicle rapidly decelerates, and said bolt engaging said lock member so as to avoid displacement of said shoulder anchor fitting member in the vertical direction of said vehicle.

19. A shoulder anchor height adjusting apparatus according to claim 18, wherein said screw member includes a resin nut provided in the vicinity of an upper end of said shoulder anchor fitting member, and said resin nut is provided with projections on said both end surfaces in the vertical direction of said vehicle and on a line extending along a longitudinal direction of said vehicle and intersecting an axis of said long bolt, said projections being provided so as to contact said supporting member.

20. A shoulder anchor height adjusting apparatus according to claim 18, wherein said anchor bolt is provided with a lock member contact portion at an outward end of said anchor bolt in the transverse direction of said vehicle, a lower end of said lock member contact portion in the vertical direction of said vehicle is provided so as to enable contact with said lock member.

* * * * *